Dec. 26, 1950 L. W. WELCH ET AL 2,535,246
CHUCK ASSEMBLY
Filed Feb. 10, 1947 2 Sheets-Sheet 1
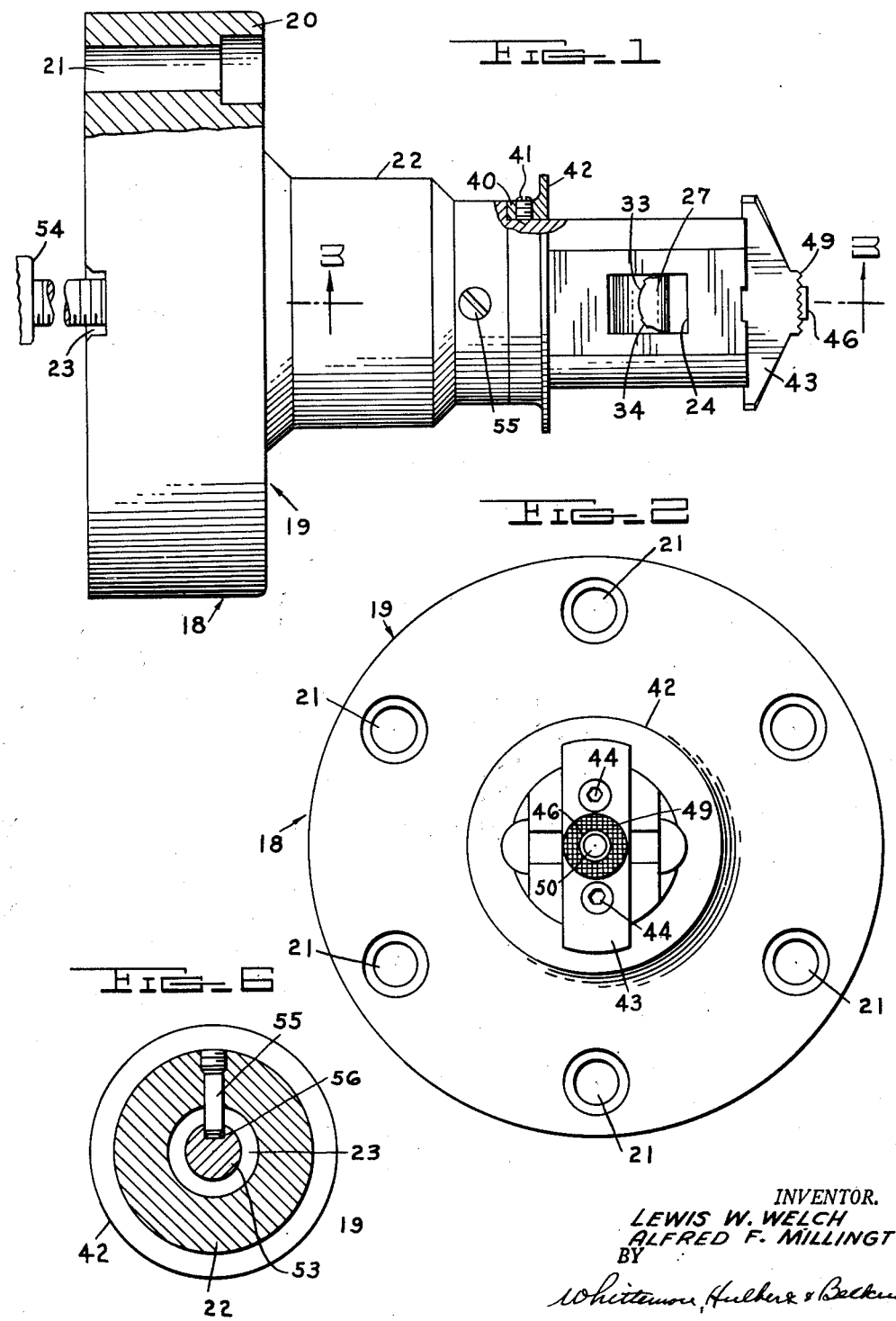
INVENTOR.
LEWIS W. WELCH
ALFRED F. MILLINGTON
BY
Whittemore, Hulbert & Belknap
ATTORNEYS Dec. 26, 1950     L. W. WELCH ET AL     2,535,246
CHUCK ASSEMBLY
Filed Feb. 10, 1947     2 Sheets-Sheet 2
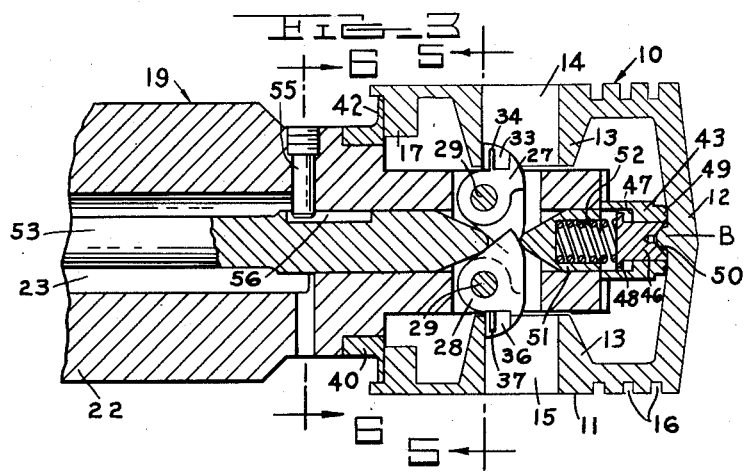
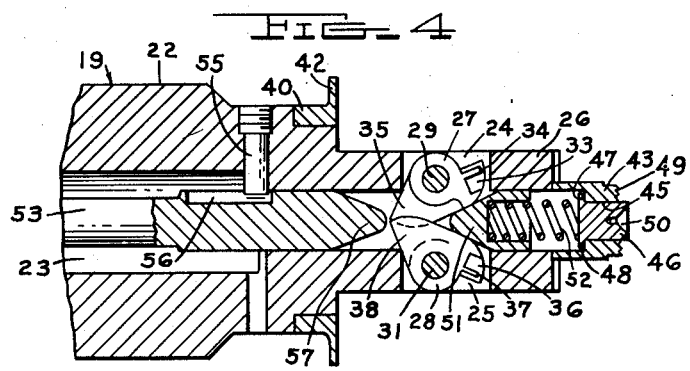
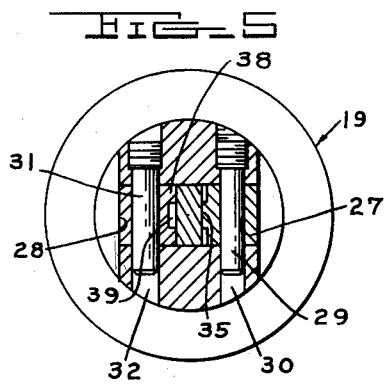
INVENTOR.
LEWIS W. WELCH
ALFRED F. MILLINGTON
BY
ATTORNEYS Patented Dec. 26, 1950

2,535,246

UNITED STATES PATENT OFFICE 2,535,246

CHUCK ASSEMBLY

Lewis W. Welch, Detroit, and Alfred F. Millington, Northville, Mich., assignors to Novi Equipment Company, Novi, Mich., a corporation of Michigan Application February 10, 1947, Serial No. 727,570

18 Claims. (Cl. 279—2)

This invention relates to improvements in work holding chuck assemblies.

One of the objects of this invention is to provide a chuck for rotating and effectively clamping a work piece in a manner such that a number of operations may be performed on the work piece without removing the work piece from the chuck. Thus the nature of the chuck enables its use in connection with automatic or multiple tool equipment to hold a work piece in the required location while the various tools are successively brought into engagement with the work. Although it will be understood from the following description that many of the principles embodied in the chuck are applicable to chucks for holding various types of work in place during different fashioning operations, nevertheless, the chuck illustrated herein is particularly adapted for holding a piston or equivalent part in position during the performance of the various specified machining operations.

With the above in view, it is another object of this invention to provide a chuck constructed to rotatably support a piston or similar part while a number of different machining operations are performed on the part. For example, the design of the chuck is such as to permit performing all of the following operations with one set up of the piston in the chuck. These operations are (1) facing the piston skirt; (2) facing the piston head; (3) turning the piston to the specified diameter; (4) rough and finish cut the annular ring grooves in the periphery of the skirt; and (5) chamfer all sharp corners. Thus the accumulative errors that frequently result when different set ups are required are eliminated and, at the same time, the machining operations are accomplished in a minimum length of time.

A further object of this invention is to provide a chuck of the above general type composed of a relatively few simple parts capable of being inexpensively manufactured, assembled and installed.

The foregoing as well as other objects will be made more apparent as this description proceeds, especially when considered in connection with the accompanying drawings, wherein:

Figure 1 is a side elevational view partly in section of a chuck assembly embodying the features of this invention;

Figure 2 is an end elevational view of the chuck assembly;

Figure 3 is a longitudinal sectional view taken substantially on the line 3—3 of Figure 1;

Figure 4 is a sectional view similar to Figure 3 showing the parts in a different position;

Figures 5 and 6 are respectively cross sectional views taken on the lines 5—5 and 6—6 of Figure 3.

For the purpose of illustration the chuck forming the subject matter of this invention is shown in connection with a piston 10 of the type commonly used in internal combustion engines, pumps and the like. In general the piston comprises a cylindrical skirt 11 open at the lower end and having a head 12 at the top or opposite end. In accordance with conventional practice, the skirt is formed intermediate the ends with a pair of bosses 13 extending inwardly from diametrically opposite sides of the skirt and having aligned bores 14 and 15 therethrough for receiving the usual wrist pin (not shown). A plurality of annular grooves 16 are formed in the periphery of the skirt 11 adjacent the head 12 of the piston and are adapted to receive the usual sealing rings (not shown). It will further be noted that an annular inwardly extending flange 17 is formed on the piston skirt 11 adjacent the lower end of the latter.

Pistons of the type briefly described above are usually formed of a casting and require a number of accurate machining operations before they are serviceable. Among these machining operations are (1) facing the skirt; (2) facing the head; (3) turning the outer cylindrical surface of the skirt to the specified outside diameter; (4) rough machining the annular grooves 16; (5) finish machining the annular grooves 16; and (6) chamfering all sharp corners.

It is the primary object of the present invention to provide a chuck for rotatably supporting the piston 10 in a manner such that all of the above operations may be effected without handling the piston or chuck. With this in view, reference is now made more in detail to the drawings, wherein a chuck embodying the features of this invention is designated generally by the reference numeral 18.

The chuck 18 comprises a head or body 19 having a cylindrical enlargement 20 at one end adapted to be secured to a rotatable part of a suitable machine and having stud receiving openings 21 therethrough for this purpose. The body 19 is further provided with an axially extending reduced portion 22 of stepped diameter and a bore 23 extends axially through the head from one end of the latter to the other.

A pair of diametrically opposed openings 24 and 25 are formed through opposite side walls of the reduced pilot portion 26 of the body 19.

Pilot portion 26 is of a size to just clear bosses 13 to help center the piston on the chuck. A pair of work clamping dogs 27 and 28 are respectively pivotally supported in the openings 24 and 25 in symmetrical relation to the axis of the bore 23 for swinging movement about substantially parallel axes extending perpendicular to the axis of the bore. In detail the dog 27 is pivotally mounted on a pin 29 extending across the opening 24 and secured in a bore 30 formed in the reduced portion 26 of the head at right angles to the bore 23. The dog 28 is journalled on a pin 31 which extends across the opening 25 and is secured in a bore 32 formed in the reduced portion 26 of the head in parallel relation to the bore 30.

The dog 27 is formed with an outwardly projecting portion 33 having an arcuate work engaging surface and having ribs 34 on this surface. It will also be noted that the dog 27 is formed with an inwardly extending cam or lever portion 35 positioned intermediate the sides of the dog and projecting into the bore 23.

The dog 28 is formed with an outwardly extending portion 36 having an arcuate work engaging surface and having ribs 37 on the latter surface. This dog is also formed with an inwardly extending cam portion 38 projecting into the bore 23 and formed with a slot 39 for receiving the cam portion 35 on the dog 27. This construction enables supporting the dogs in a common plane extending radially with respect to the axis of the bore 23 and contributes materially in providing a compact assembly.

The piston 10 is adapted to be slipped over the reduced portion 26 of the body 19 in the manner indicated in Figure 3 of the drawings. It will be noted that when the piston is initially positioned on the reduced portion 26, the dogs are in their inoperative positions shown in Figure 4, or in other words, are located within the confines of the reduced portion 26 so as not to interfere with the wrist pin bosses 13 on the piston. In this connection it will, of course, be noted that the piston is angularly adjusted relative to the reduced portion 26, so that the bores through the wrist pin bosses register with the openings 24 and 25.

The lower end portion of the piston 10 is positioned on the body 19 by a ring 40 of wear resisting material having a hub sleeved on the head at the inner end of the reduced portion 26 and secured in place by a set screw 41. The ring 40 is formed with a radially outwardly extending flange 42 at the outer end, and the outer surface of this flange provides a seat for engaging the bottom surface of the annular flange 17 on the piston. The diameter of the flange 42 approximates the internal diameter of the adjacent end of the piston skirt and is received in the latter to assist in positioning the piston on the head 19.

In order to locate the piston at the outer end of the reduced portion 26 on the head 19, a positioning member 43 is provided. The positioning member 43 is located on the outer end of the reduced portion 26, and is secured in place by studs 44. It will be noted from Figure 2 of the drawings that the width of the positioning member is less than the clearance provided between the inner ends of the wrist pin bosses 13, so as not to interfere with movement of the piston over the end of the body 19. However, the length of the member 43 approximates the internal diameter of the piston, and cooperates with the ring 40 to locate the piston on the reduced outer end 26 of the head. The member 43 is formed with a centrally located bore 45 and a plunger or pilot plug 46 is slidably mounted in the bore 45. The bore 45 is enlarged at the rear end to form an annular shoulder 47 for engagement with a radially outwardly extending annular flange 48 on the rear end of the plunger 46. The outer end of the plunger 46 extends beyond a central boss 49 formed on the member 43, and is fashioned with a conical recess 50. As shown in Figure 3 of the drawings, the recess 50 is adapted to receive the bead B ordinarily formed on the inner surface of the piston head 12 at the center of the latter. It will also be noted from Figure 3 of the drawings that the outer surface of the boss 49 is serrated to intimately engage the piston head around the plunger 46.

The bore 45 through the member 43 is aligned with the bore 23, and a follower 51 is slidably supported in the bore 23 between the plunger 46 and the clamping dogs. A coil spring 52 is positioned in the aligned bores 45 and 23 with the opposite ends respectively engaging the follower 51 and the plunger 46. Thus the coil spring normally urges the plunger 46 to its outermost position shown in Figure 4 of the drawings, and also urges the follower 51 into engagement with the cam portions on the dogs to hold the latter in their inoperative positions also shown in Figure 4 of the drawings.

The dogs are operated against the action of the spring 52 by a second plunger 53 supported in the bore 23 for sliding movement in opposite directions and having the inner end projecting beyond the corresponding end of the body 19 for connection with suitable operating means such, for example, as a fluid pressure operated cylinder 54. The plunger is prevented from rotation relative to the head by a pin 55 extending through an opening formed in the head 19 and engaging in an elongated slot 56 formed in the plunger 53. The outer end 57 of the plunger is shaped to engage the cam portions on the dogs and to swing the latter in a direction toward the work engaging ring 40.

*Operation*

Assuming that a piston 10 is positioned on the reduced outer end portion 26 of the body 19, and that the parts of the chuck are in the relative positions thereof shown in Figure 4 of the drawings, it will be noted that outward movement of the plunger 53 engages the nose portion 57 of the plunger with the cam portions 35 and 38 on the two clamping dogs. Continued outward movement of the plunger 53 swings the dogs to move the work engaging surfaces thereof into the bores through the wrist pin bosses 13. As stated above, the work engaging surfaces 33 and 36 on the respective clamping dogs are arcuate in order to conform to the adjacent surfaces of the wrist pin bores.

As the dogs are swung outwardly by the plunger 53, the piston 10 is shifted rearwardly relative to the head 19, and the annular flange 17 is effectively clamped against the ring 42. Of course, rearward shifting movement of the piston 10 forces the plunger 46 in a corresponding direction against the action of the spring 52 and enables the boss 49 on the positioning member 43 to intimately engage the adjacent surface of the piston head 12. Upon initial placement of the piston on the chuck the bead or projection B engages the spring pressed pilot plug 46, which at this time is under relatively light spring compulsion. As dogs 27 and 29 swing into work engaging position, portions 33 and 36 enter the pin bores 14, and move toward the seat formed by ring 40. Since the pins 29 have their axes in a plane tangent to the surfaces of the bores 14 remote from the head 12 of the piston, the piston is urged squarely onto its seat. As this takes place, the compression of spring 52 increases to a maximum, due to movement of follower 51, which insures accuracy of location of the piston as the boss 49 engages the underside of the piston. This occurs just as the piston engages its seat.

It follows from the foregoing that the piston is accurately centered on the rotatable body 19, and is effectively clamped to the latter against movement relative thereto. It will also be noted that the clamping action is effected in such a manner that there is no tendency to distort or otherwise damage the piston. While the piston is thus supported, all of the various operations previously enumerated may be accomplished without handling either the piston or the chuck.

When it is desired to release the piston from the chuck, the plunger 53 is merely moved inwardly in a direction away from the dogs 27 and 28. In response to the above operation, the follower 51 is operated by the spring 52 to return the dogs to their inoperative positions within the confines of the reduced portion 26 on the head, and the plunger 46 is moved to its outermost position shown in Figure 4 of the drawings. The piston 10 may then be readily removed from the chuck without interference from any part of the latter.

What we claim as our invention is:

1. A chuck assembly comprising a head having an axially extending bore and having an annular work engaging surface encircling the bore, work clamping dogs respectively supported on the head in symmetrical relation to the axis of the bore means mounting said dogs for swinging movement only about substantially parallel axes extending transversely of the bore and having work engaging portions alternatively movable toward and away from the work engaging surface on the head upon swinging movement of the dogs in opposite directions about their respective axes, means movable axially of the bore and engageable with the dogs to swing the latter in a direction to move the work engaging portions toward the work engaging surface.

2. A chuck assembly comprising a head having an axially extending bore and having an annular work engaging surface encircling the bore, work clamping dogs respectively pivotally supported on the head in symmetrical relation to the axis of the bore for swinging movement about substantially parallel axes extending transversely of the bore and having work engaging portions alternatively movable toward and away from the work engaging surface on the head upon swinging movement of the dogs in opposite directions about their respective axes, a plunger supported in the bore for sliding movement relative to the head, and means on the dogs projecting into the path of travel of the plunger for engagement by the latter to swing the dogs in a direction toward the work engaging surface.

3. A chuck assembly comprising a head having an axially extending bore and having an annular work engaging surface encircling the bore, work clamping dogs respectively pivotally supported on the head in symmetrical relation to the axis of the bore for swinging movement about substantially parallel axes extending transversely of the bore and having work engaging portions alternatively movable toward and away from the work engaging surface on the head upon swinging movement of the dogs in opposite directions about their respective axes, a plunger supported in the bore for sliding movement in opposite directions relative to the head, means on the dogs extending into the path of travel of the plunger and engageable by the plunger upon movement of the latter in one direction to swing the dogs in a direction toward the work clamping surface, and means responsive to movement of the plunger in the opposite direction to swing the dogs in a direction away from said work engaging surface.

4. A chuck assembly comprising a head having an axially extending bore and having an annular work engaging surface encircling the bore, work clamping dogs respectively pivotally supported on the head in symmetrical relation to the axis of the bore for swinging movement about substantially parallel axes extending transversely of the bore and having outwardly extending work engaging portions, means on the dogs projecting into the bore intermediate the ends of the latter, a plunger slidably supported in the bore at one side of the dogs for engaging the projecting means to swing the dogs in a direction toward the work engaging surface, and spring operated means in the bore at the opposite side of the dogs for engaging the dog projecting means to oppose swinging movement of the dogs by the plunger.

5. A chuck assembly comprising a head having an axially extending bore and having an annular work engaging surface encircling the bore, a pair of work clamping dogs respectively pivotally supported on the head in symmetrical relation to the axis of the bore for swinging movement in a common plane extending radially with respect to the bore axis and having outwardly projecting work engaging portions, a projection on one dog extending toward the axis of the bore, a projection on the other dog also extending toward the bore axis and slotted to provide clearance for the projection on said one dog, and a plunger supported in the bore for sliding movement and engageable with the projections to swing both dogs in a direction toward the work engaging surface.

6. A chuck assembly comprising a head having an axially extending bore and having an annular work engaging surface encircling the bore, a pair of work clamping dogs respectively pivotally supported on the head in symmetrical relation to the axis of the bore for swinging movement in a common plane extending radially with respect to the bore axis and having outwardly projecting work engaging portions, a projection on one dog extending into the bore intermediate the ends of the latter, a projection on the other dog also extending into the bore and slotted to provide clearance for the projection on the first dog, a plunger supported in the bore at one side of the dogs for sliding movement and engageable with said projections to swing both dogs in a direction toward the work engaging surface, and spring operated means supported in the bore at the opposite side of the dogs and engageable with the latter to oppose swinging movement of the dogs by said plunger.

7. A chuck assembly comprising a head having an axially extending bore and having an annular work engaging surface encircling the bore, work clamping dogs respectively pivotally supported on the head in symmetrical relation to the axis of the bore for swinging movement about axes extending transversely of the bore and having work engaging portions alternatively movable toward and away from the work engaging surface on the head upon swinging movement of the dogs about their respective axes, and an additional work clamping element operated in response to swinging movement of said dogs.

8. A chuck assembly comprising a head having an axially extending bore and having an annular work engaging surface encircling the bore, work clamping dogs respectively pivotally supported on the head in symmetrical relation to the axis of the bore for swinging movement about axes extending transversely of the bore and having work engaging portions alternatively movable toward and away from the work engaging surface on the head upon swinging movement of the dogs about their respective axes, and yieldable means on the head engageable with an article to be clamped thereon for centering the article on said head prior to swinging movement of the dogs to their work clamping position.

9. A chuck assembly comprising a head having an axially extending bore and having an annular work engaging surface encircling the bore, work clamping dogs normally located within the confines of the head in symmetrical relation to the axis of the bore for swinging movement about axes extending generally perpendicular to the bore axis, work engaging projections on the dogs movable outwardly through openings in the head in response to swinging movement of the dogs in a direction toward the work engaging surface, and a plunger supported in the bore for sliding movement and engageable with the dogs to swing the latter in a direction toward the work engaging surface.

10. A chuck assembly comprising a head having an axially extending bore and having an annular work engaging surface concentric with the bore intermediate the ends thereof, a locating plunger slidably supported at one end of the bore for engagement with a part of the work to be clamped, spring means normally urging the plunger in a direction toward the work, work clamping dogs respectively pivotally supported on the head between the plunger and work engaging surface in symmetrical relation to the bore axis for swinging movement about substantially parallel axes extending generally perpendicular to the bore axis, means movable axially of the bore and engageable with the dogs to swing the latter outwardly in a direction toward the work engaging surface, and means responsive to outward swinging movement of the dogs to compress said spring means.

11. A chuck assembly comprising a head having an axially extending bore and having an annular work engaging surface encircling the bore, work clamping dogs respectively pivotally supported on the head in symmetrical relation to the axis of the bore for swinging movement about substantially parallel axes extending transversely of the base and having outwardly extending work engaging portions, means on the dogs projecting into the bore intermediate the ends of the latter, a plunger slidably supported in the bore at one side of the dogs for engaging the projecting means to swing the dogs in a direction toward the work engaging surface, a locating plunger slidable in the bore at the opposite end of the dogs and engageable with a part of the work to be clamped, a member slidable in the bore between the locating plunger and dogs for engagement by the latter as they are swung outwardly toward the work engaging surface, and a spring positioned between the member and locating plunger with the opposite ends respectively engaging said member and locating plunger.

12. A chuck assembely for pistons of the type having a head, a generally cylindrical skirt, pin receiving bores in the skirt, and a centering projection on the underside of said head, comprising: a body having an annular work supporting seat and a reduced portion extending beyond said seat and adapted to enter into the hollow interior of a piston, a pair of dogs pivoted to said reduced portion and having work engaging end portions movable into and out of the pin receiving bores of a piston on said seat, and having their pivot axes located substantially in the plane tangent to the sides of the pin receiving bores remote from the head of the piston, and means for swinging said dogs to press the piston firmly on said seat with pressure normal thereto.

13. A chuck assembly for pistons of the type having a head, a generally cylindrical skirt, inwardly extending bosses on said skirt, pin receiving bores through said bosses, and a centering projection on the underside of said head, comprising: a body having an annular work supporting seat and a reduced pilot portion extending beyond said seat and adapted to enter into the hollow interior of a piston, said pilot portion having piloting clearance with the inner ends of said bosses, a pair of dogs pivoted to said reduced portion and having work engaging end portions movable into and out of the pin receiving bores of a piston on said seat, and having their pivot axes located substantially in the plane tangent to the sides of the pin receiving bores remote from the head of the piston, and means for swinging said dogs to press the piston firmly on said seat with pressure normal thereto, said dogs being fully received within said reduced portion in retracted position.

14. A chuck assembly for pistons of the type having a head, a generally cylindrical skirt, inwardly extending bosses on said skirt, pin receiving bores through said bosses, and a centering projection on the underside of said head, comprising: a body having an annular work supporting seat and a reduced pilot portion extending beyond said seat and adapted to enter into the hollow interior of a piston, said pilot portion having piloting clearance with the inner ends of said bosses, a pair of dogs pivoted to said reduced portion and having work engaging end portions movable into and out of the pin receiving bores of a piston on said seat, and having their pivot axes located substantially in the plane tangent to the sides of the pin receiving bores remote from the head of the piston, and means for swinging said dogs to press the piston firmly on said seat with pressure normal thereto, said dogs being fully received within said reduced portion in retracted position, and being movable through an arc of approximately 90° between fully retracted and work engaging position.

15. A chuck assembly for pistons of the type having a head, a generally cylindrical skirt, pin receiving bores in the skirt and a centering projection on the underside of said head, comprising: a body having a seat on which the piston is supported, a reduced pilot portion extending beyond said seat, a pair of dogs pivoted to said pilot portion and movable into and out of the piston bores and having their pivot axes located such that the engagement between said dogs with the piston bores applies pressure toward said seat, a pilot plug at the end of said pilot portion engageable with the centering projection, a spring urging said plug outwardly, and mechanism effective to swing said dogs to piston engaging position and simultaneously to increase the force of the spring acting on said plug.

16. A chuck assembly for pistons of the type having a head, a generally cylindrical skirt, pin receiving bores in the skirt and a centering projection on the underside of said head, comprising: a body having a seat on which the piston is supported, a reduced pilot portion extending beyond said seat, a pair of dogs pivoted to said pilot portion and movable into and out of the piston bores and having their pivot axes located such that the engagement between said dogs with the piston bores applies pressure toward said seat, a pilot plug at the end of said pilot portion engageable with the centering projection, a spring urging said plug outwardly, a rigid piston engaging element surrounding said plug engageable with the underside of the piston head, and mechanism effective to swing said dogs to piston engaging position and simultaneously to increase the force of the spring acting on said plug, said plug being under maximum spring compulsion as said element engages the underside of the piston head.

17. In a chuck of the character described, a body having work engaging dogs pivoted thereto, said dogs including actuating cam levers, a slidable centering plug in said body, a compression spring between said plug and said levers, and means engageable with said levers to swing said levers to cause said dogs to engage the work and to simultaneously increase the pressure of said spring acting on said plug.

18. In a chuck of the character described, a body having movable work clamping means thereon, and a rigid work engaging element, a movable locating pilot on said head, a compression spring urging said pilot outwardly from said element, and power means for simultaneously actuating said clamping means and increasing the force of said spring whereby said pilot is under maximum spring compulsion as said element is engaged by the work.

LEWIS W. WELCH.
ALFRED F. MILLINGTON.

REFERENCES CITED

The following references are of record in the file of this patent:

UNITED STATES PATENTS

| Number | Name | Date |
|---|---|---|
| 1,947,957 | Tillman | Feb. 20, 1934 |
| 2,050,828 | Buell | Aug. 11, 1936 |